United States Patent [19]

Pinkus et al.

[11] Patent Number: 5,729,010
[45] Date of Patent: Mar. 17, 1998

[54] NIGHT VISION DEVICE LOCALIZED IRRADIANCE ATTENUATION

[75] Inventors: Alan R. Pinkus, Bellbrook; Harry L. Task, Dayton; Peter L. Marasco, Kettering, all of Ohio

[73] Assignee: The United States of America as represented by the Secretary of the Air Force, Washington, D.C.

[21] Appl. No.: 712,506

[22] Filed: Sep. 11, 1996

[51] Int. Cl.$^6$ .................................................. H01J 31/50
[52] U.S. Cl. ..................... 250/214 VT; 313/524
[58] Field of Search ................... 250/207, 214 VT; 313/524, 528, 534; 315/149

[56] References Cited

U.S. PATENT DOCUMENTS

| | | | |
|---|---|---|---|
| 4,037,132 | 7/1977 | Hoover | 315/10 |
| 4,166,213 | 8/1979 | Hoover | 250/214 VT |
| 4,755,725 | 7/1988 | Kastendieck et al. | 250/214 VT |
| 4,909,609 | 3/1990 | McDowell | 359/241 |
| 4,924,080 | 5/1990 | Caserta et al. | 250/214 VT |
| 4,961,025 | 10/1990 | Thomas et al. | 313/524 |
| 5,001,558 | 3/1991 | Burley et al. | 348/164 |
| 5,049,995 | 9/1991 | Shimoni | 348/217 |
| 5,146,077 | 9/1992 | Caserta et al. | 250/214 VT |
| 5,218,194 | 6/1993 | Garbi et al. | 250/214 VT |
| 5,336,881 | 8/1994 | Caserta et al. | 250/214 VT |
| 5,402,034 | 3/1995 | Blouch et al. | 313/370 |
| 5,537,261 | 7/1996 | Palmer | 359/819 |

*Primary Examiner*—Stephone B. Allen
*Attorney, Agent, or Firm*—Gerald B. Hollins; Thomas L. Kundert

[57] ABSTRACT

A night vision device enhancement wherein occurrence of a bright object in an input scene of the night vision device is precluded from adversely affecting reproduction of adjacent low radiance level portions of the input scene. By optically limiting or excluding bright object input scene portions from the night vision device input field the disclosed system precludes both image intensifier-related effects, effects such as blooming and current saturation, and also precludes automatic gain control-related effects such as full-field sensitivity decrease based on the bright object. Plural embodiments of the system are disclosed, embodiments based on bright object attenuation by both yet to be developed photo active materials such as photochromics and embodiments which use present state of the art liquid crystal materials and accompanying electronics. Military and non-military uses of the improved night vision device are contemplated.

18 Claims, 3 Drawing Sheets

NIGHT VISION DEVICE LOCALIZED IRRADIANCE ATTENUATION

RIGHTS OF THE GOVERNMENT

The invention described herein may be manufactured and used by or for the Government of the United States for all governmental purposes without the payment of any royalty.

BACKGROUND OF THE INVENTION

This invention concerns the subject of bright object or bright pixels in a dark viewing field protection for night vision equipment.

When night vision devices or NVDs (e.g., those utilizing passive image intensifier tubes, such as night vision goggles) are used to view night-sky illuminated scenes, bright light sources within the field of view adversely affect the automatic gain control (AGC) of the NVD thereby causing loss of information from the dimmer areas of the same image. With few exceptions, the information present from all of these passive image intensification devices is degraded when one or more bright light point sources (e.g., street or head lights, lasers, flares or other bright localized sources) are within the field of view (FOV). This is a commonly encountered problem when NVDs are used in areas that contain one or more bright point sources. The present invention electro-optical device eliminates this difficulty by selectively blocking localized bright light sources within the NVD's field of view from entering the image intensifier tube of the NVD. The present invention device may be used by ground troops, special operations forces, or maritime pilots/navigators while performing tasks such as: vehicle driving or flying, navigation, surveillance, battlefield observation/management, forward observer targeting/designation, rescue, and cargo handling.

The U.S. patent art indicates the presence of ongoing inventive activity in the field of night vision devices and their improvement. One patent relating to present aspects of this activity is U.S. Pat. No. 5,146,077 issued to J. N. Caserta et al., a patent concerned with protection of an image intensifier tube, as used in a night vision device, from damage and resolution loss resulting from receipt of a bright source image. The Caserta et al. patent employs modulation or change of electrode energization voltages, specifically the photocathode voltage, in order to maintain the photocathode current in a desired operating rage. In practice this control of photocathode current is achieved with the use of a high impedance voltage source and a pulse width modulation arrangement for photocathode energization. The Caserta et al. patent in view of such an electronic treatment of the bright image source event appears to be only distally related to the optical attenuation concept of the present invention.

In a similar manner the U.S. Pat. No. 4,037,132 is of general background interest with respect to the present invention in the sense that it discloses a power supply clamp circuit used to protect cathodes in the presence of a bright source. A related patent U.S. Pat. No. 4,166,213 describes application of the '213 patent power supply clamp circuit. In view of such additional electronic treatment of the bright image source, these patents also appear to be only distally related to the optical attenuation concept of the present invention.

The invention of U.S. Pat. No. 5,001,558 is also of some interest with respect to the present invention in the sense that it discloses use of color to identify bright sources such as highway signs and vehicle headlights in an input scene. The absence of optical exclusion of the bright image suggests however, that the '558 apparatus is only distally, if at all, related to the present night vision invention.

The U.S. Pat. Nos. 5,402,034, 5,218,194, 4,961,025 and 4,924,080 are also of general background interest with respect to the present invention in the sense that they disclose the microchannel plate electron multiplier concept used in later image intensifier tubes for amplification while limiting the extent of blooming and other responses to a bright source image. These patents also appear to use the power supply related automatic brightness control arrangement and apply regulated voltages to plural electrodes of the tube for example. The absence of optical exclusion of the bright image suggests however, that these patents are only distally, if at all, related to the present night vision invention.

The invention of U.S. Pat. No. 4,909,609 is also of general interest with respect to the present invention in the sense that it discloses use of nonlinear optical elements such as frequency doubling crystals to exclude bright source images from the input of a night vision device. The '609 patent is especially concerned with bright object inputs from a source such as a hostile laser and also describes the more elementary techniques such as spectral filtering and fast acting shutters which have been used to countermeasure such bright sources. The absence of selective pattern related optical exclusion of the bright image suggests however, that the '609 patent apparatus is only distally related to the present night vision invention.

The invention of U.S. Pat. No. 5,049,995 is also of general interest with respect to the present invention in the sense that it discloses an intensifier tube protection arrangement used in a television inclusive night vision device. In the '995 patent a bright source which is identified by "spikes" in a first pixel set of data, is replaced by information from a second pixel set of data, information which has been processed to be in a more desirable form. The absence of selective pattern related optical exclusion of the bright image suggests however, that the '995 patent apparatus is only distally related to the present night vision invention.

The invention of U.S. Pat. No. 5,276,539 is also of general interest with respect to the present invention in the sense that it discloses use of a modulator device such as a liquid crystal apparatus for interrupting the transmission of light to the human eye at some eye-imperceptible frequency. Such modulation by a device called a time-varying shutter, a TVS, is used to control brightness or achieve dimming of an input scene. The '539 moreover speaks of using a modified arrangement of the TVS apparatus, a "nodalized" TVS or NTVS system in a night vision environment such as night driving. The absence of both selective pattern-related optical exclusion of the bright image and of an actual night vision device suggests however, that the '539 patent apparatus is only distally related to the present night vision invention.

The invention of U.S. Pat. No. 4,472,708 is also of general interest with respect to the present invention in the sense that it discloses use of a see-through data display which may involve a liquid crystal apparatus and also mentions use of such a display in connection with "night-vision intensifier goggles". The absence of selective, input data determined, pattern related optical exclusion of the bright image suggests however, that the '708 patent apparatus is only distally related to the present night vision invention.

SUMMARY OF THE INVENTION

The present invention provides for improved overall scene performance in a night vision device exposed to a low light level input scene which includes one or more bright objects.

It is an object of the present invention therefore, to provide a spatially selective input scene attenuator for a night vision device.

It is another object of the invention to provide bright object protection for a night vision device.

It is another object of the invention to achieve automatic gain control circuit protection in a night vision device.

It is another object of the invention to provide optically based gated automatic gain control for a night vision device.

It is another object of the invention to provide improved night vision device response to low light level pixels surrounding a bright object in an input scene.

It is another object of the invention to combine the functions of a liquid crystal display apparatus with the optical components of a night vision device.

It is another object of the invention to provide bright object protection for a night vision device without resort to manipulation of power source parameters in the night vision device.

It is another object of the invention to provide a bright object attenuation arrangement which may be used with a night vision goggle, a night vision periscope, a night vision telescope, a night vision gun sight, a night vision spotting scope, a night vision video camera, night vision binoculars, helmet mounted night vision apparatus, and other night vision devices.

It is another object of the invention to provide a night vision device bright object attenuation apparatus which can be fabricated from ordinary and readily available components.

Additional objects and features of the invention will be understood from the following description and claims and the accompanying drawings.

These and other objects of the invention are achieved by the method for enhancing low radiance object reproduction in the presence of a concurrent high radiance signal within the input image field of an automatic gain control-inclusive night vision device, said method comprising the steps of:

examining an optical representation of said input image field for presence of optical signal portions exceeding a selected radiance level;

optically attenuating from said input image field physical portions thereof corresponding to said high radiance level signal;

generating a night vision device sensitivity-determining automatic gain control signal from lower radiance object portions of said input image field remaining after said optically attenuating step;

transducing said lower radiance object portions of said input image field remaining after said optically attenuating step to electrical charge video signals;

reproducing said remaining lower radiance object portions of said input image in an output image generator portion of said night vision device from amplified said electrical charge video signals;

controlling an electrical charge video signal communicating portion of said night vision device and thereby a communicating of said electrical charge video signals relevant to said reproducing step with said sensitivity-determining automatic gain control signal.

DETAILED DESCRIPTION

Figure 7:
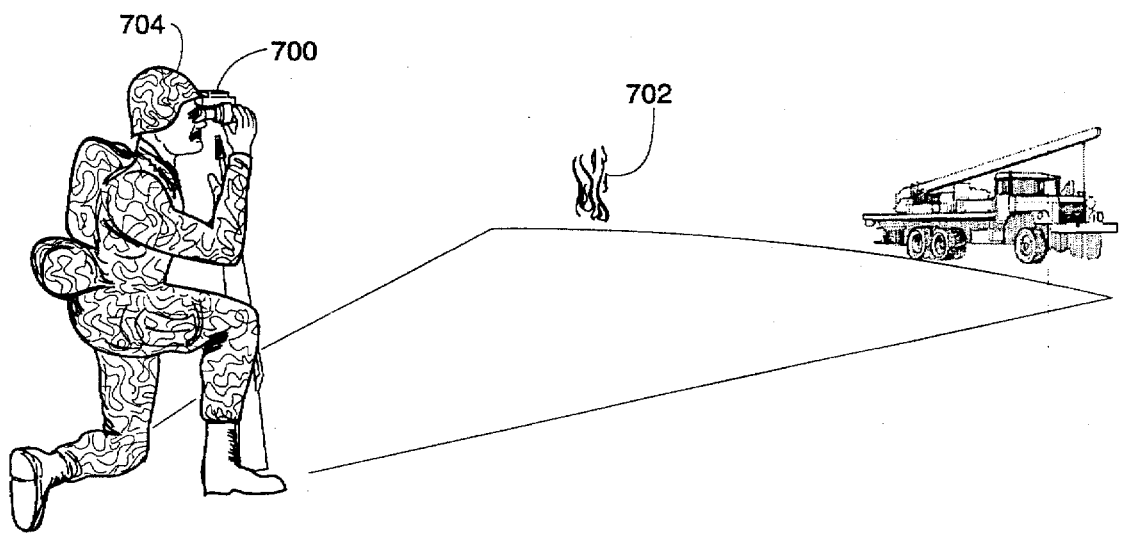
FIG. 7 shows an overall view of a night vision device viewing a scene which includes a single bright object.

FIG. 7 in the drawings shows an overall perspective view of a military-configured night vision device 700 viewing an input scene which includes a single bright or high radiance object, the fire 702. The fire 702 is located in a typical low light level night scene environment, an environment which is of primary military interest to the observer 704. The output image generated by the night vision device 700 when the device is configured in the manner of the best presently available night vision equipment, a Generation III system as used by the United States military, may be somewhat less than desired by the observer 704 in several respects.

A major one of these shortfall respects is concerned with the mere presence of the fire 702 in the FIG. 7 scene and the fact that this presence can be expected to decrease the overall sensitivity of the night vision device 700 to the low light level night scene environment which is of primary interest to the observer 704. This sensitivity decrease is primarily a result of two somewhat related actions, i.e., an area of large photocathode current flow resulting from the fire 702 and an attempt by the automatic gain control system in the night vision device 700 to decrease or control the magnitude of this bright object originating current flow. These actions and the improvement made possible by the present invention are described in the following paragraphs of this document.

NVDs are therefore capable of amplifying an image representing for example terrain illuminated by very low amounts of near infrared energy from sources such as the moon or starlight. Passive image intensification devices (e.g., night vision goggles) are however, provided with an automatic gain control circuit that limits the maximum amount of current flowing within the image intensifier tube, a linear device. As scene illumination varies across the tube, different amounts of photocathode-originated current flow proportionally for each illumination level at a given physical location. A representative plot of photocathode current flow at different physical positions of an input scene appears in FIG. 1a of the drawings.

Figure 1A:
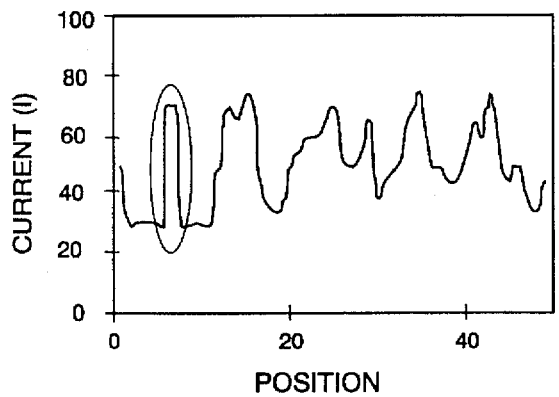
FIG 1a shows a photocathode current waveform portion for a night vision device viewing a typical and generally homogeneous night scene.
Figure 1B:
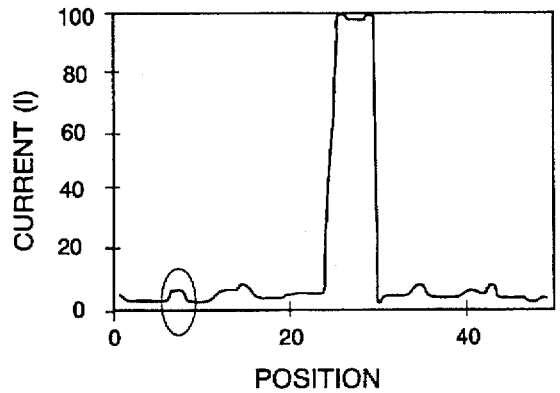
FIG 1b shows a photocathode current waveform portion for a night vision device viewing a night scene incorporating a single bright object.

By way of explanation, the FIG. 1a and FIG. 1b drawings represent the sample of an input scene which would be obtained from one scan of a scanned retina or "active" transducer device such as a vidicon. The night vision device of primary interest in the present invention is however, not of the scanned image active variety but of the passive or image intensifier tube type wherein input and output transducer devices are located within a single envelope and are connected by an array of charge carrier or electron multiplying hollow fiber-like members i.e., a microchannel plate electron multiplier. In such a tube secondary emission electron multiplication occurs within the fiber-like elements and the quantity of fiber output electrons is greater than the number of input electrons by e.g., several hundred times, so that a form of input transducer signal "amplification" is said to occur. Such an intensifier tube does not rely on a scanning mechanism and moreover in such a tube often the only available control element for automatic gain control purposes is a full screen-acting control involving change of an electron acceleration potential. The FIG. 1a waveform therefore represents a photocathode current variation which might be experienced during the scanning of a typical night vision scene. The circled feature at a horizontal position of about 7 in FIG. 1a represents a visible object as seen at the input of the NVD.

When a very bright source is located within the field of view of a night vision device (e.g., at about position 27 in FIG. 1b,) the corresponding localized area of the night vision device photocathode and electron multiplier array draw a disproportionate amount of current relative to the elements processing adjacent, dimmer areas of the scene. Note that the resulting amplification of the position 7 circled object from FIG. 1a has been proportionally lowered in FIG. 1b and now cannot be differentiated from objects located in the adjacent locations (or background) of the FIG. 1a and FIG. 1b waveforms. The total amount of current (or the areas under the FIG. 1 curves) is usually limited by the automatic gain control circuit of the night vision device and this results in an insufficient amount of current being available for amplification of the lower radiance or dimmer parts of the scene when a bright object is present. The present invention actively blocks bright sources of light from receipt at the photocathode thus freeing current for use by the darker areas of the scene and providing greater output contrast than that represented in the FIG. 1b output waveform.

Figure 2:
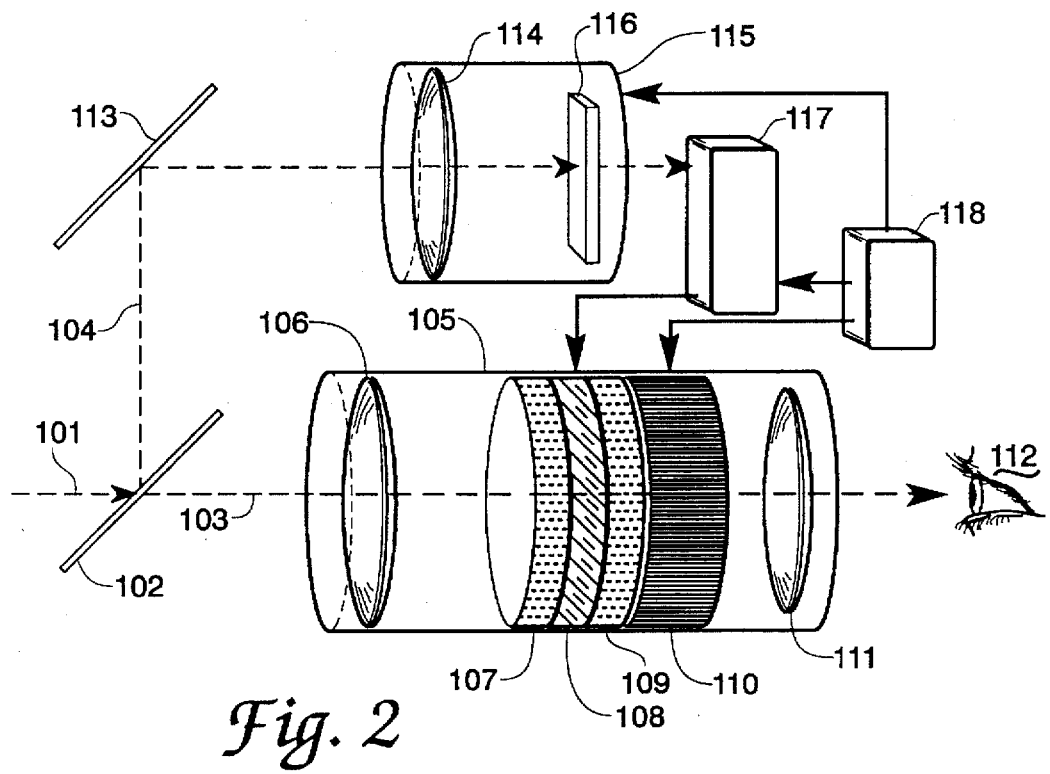
FIG. 2 shows a beamsplitter and mirror-inclusive liquid crystal arrangement of the invention.

FIG. 2 in the drawings shows a schematic representation of one arrangement of a NVD localized irradiance attenuator device according to the invention. In FIG. 2 radiant energy from the night scene enters the device along the optical path 101 and is divided by a beam splitter 102 to travel along two optical paths 103 and 104. In the first path 103 this energy enters the night vision device 105, passes through the objective lens 106, a linear polarizer 107, a liquid crystal matrix (LCM) 108, and another linear polarizer 109 to reach the image intensifier tube 110. In the image intensifier tube photons are converted to electrons, amplified, then converted to visible green light for viewing through the eyepiece 111 by the observer 112. Existing NVDs do not contain the linear polarizers 106 and linear polarizer 109 or a liquid crystal matrix 108.

The second optical path 104 originates in the beam splitter 102 and includes a reflection by a front-surface mirror 113 into the objective lens 114 of a low light level charged coupled device (LLLCCD) TV camera 115. The CCD array 116 of this camera is coupled to the liquid crystal matrix 108, located inside of the night vision device 105 between the linear polarizers 107 and 109 and preceding the image intensifier tube 110. This connection is accomplished by the electronic circuits 117. A one-to-one optical relationship exists between local areas of the TV camera's CCD array 116 and areas of the image intensifier tube of the night vision device 105 relative to the outside nighttime scene upon which they are focused. If If a bright, localized area of the night scene is viewed, it enters both the night vision device 105 and the LLLCCD TV camera 115. The bright area activates local pixels of the CCD array 116 and also pixels of the liquid crystal matrix 108. An activated pixel in the CCD array 116 of the TV camera 115 changes the polarization of the liquid crystal matrix 108 pixels relative to the two linear polarizers 107 and 109. Crossed polarization (as accomplished by this action of the liquid crystal matrix 108) between the linear polarizer 107 and 109 greatly attenuates a bright, localized spot of light thereby blocking its entry into and subsequent amplification by the image intensifier tube 110. A battery or other type of power supply 118 is used to energize the 117 and other energy-requiring portions of the FIG. 1 apparatus.

Figure 3:
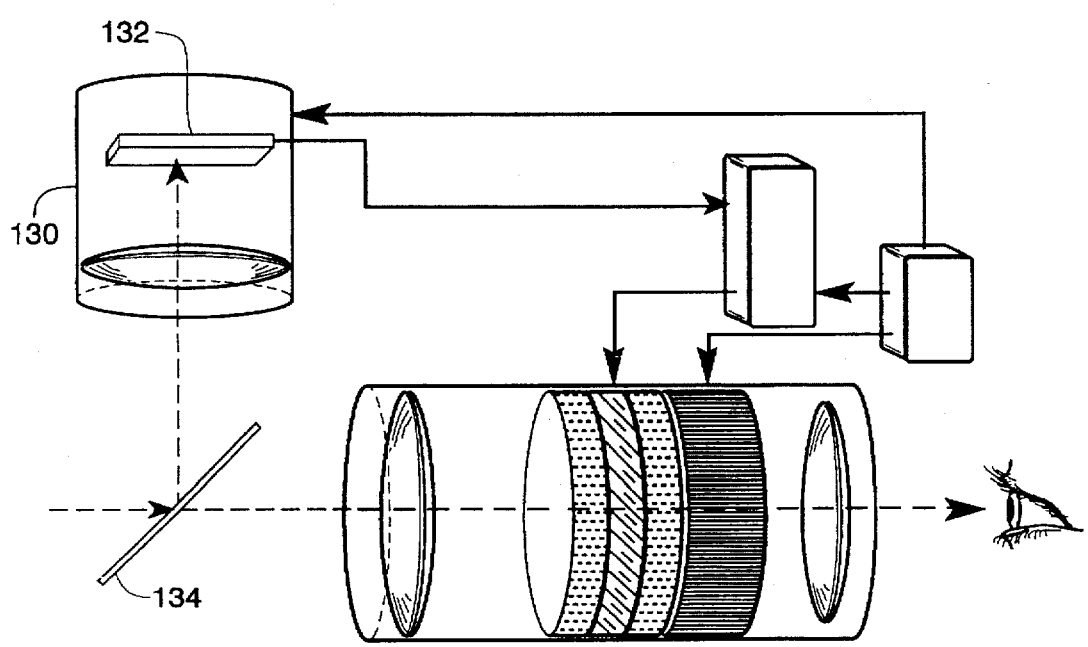
FIG. 3 shows a beamsplitter-inclusive liquid crystal arrangement of the invention.

The FIG. 2 configuration of the invention uses a beam splitter 102 and mirror 113 in order to achieve a better weight distribution (e.g., a desired center of gravity) for the night vision device 105. This configuration also allows a very accurate alignment of the optical images. FIG. 3 in the drawings shows however, a night vision device which is similar to the device of FIG. 2 except that the mirror 113 is replaced by the LLLCCD TV camera 130. The unnumbered parts of the FIG. 4 apparatus are recognizable from the descriptions of similar parts in FIGS. 2 and 3. Since the beam splitter 134 in FIG. 3 reverses the image received at the 130, the CCD array 132 of the TV camera 130 must be electronically scanned backwards to right the image. Such scanning is believed easily accomplished by persons skilled in the electronic arts.

Figure 4:
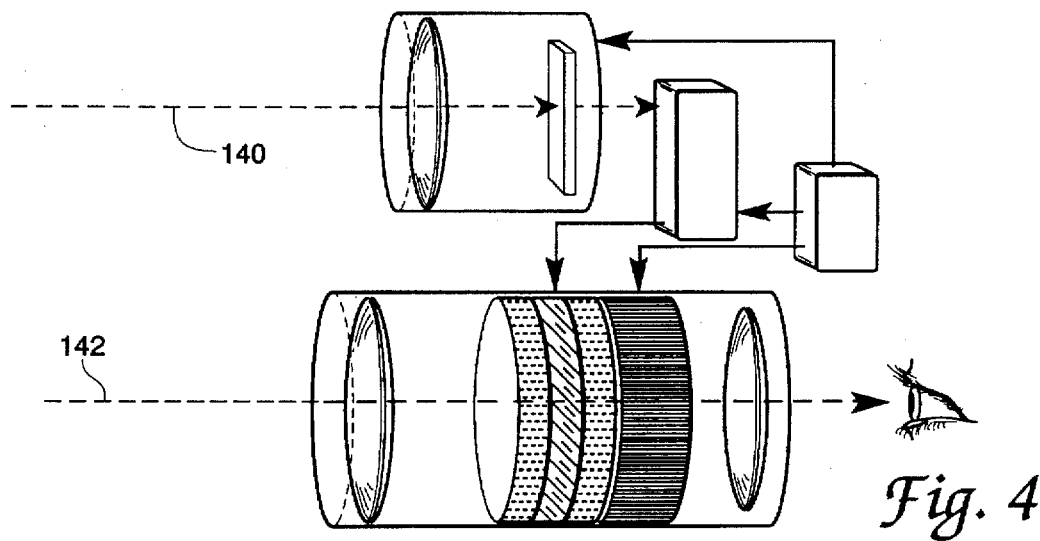
FIG. 4 shows a direct view or two path liquid crystal arrangement of the invention.

FIG. 4 of the drawings shows a simple configuration of the invention wherein it is assumed that the night scene images are far away and the LCM pixels used to block the objected-to bright object image are large and of lower resolution relative to pixels of an image intensifier tube 136. Under such conditions a parallel alignment of the two input optical paths 140 and 142 is sufficient to provide the necessary correspondence of the images and LCM pixels to enable a satisfactory obscuring of the bright object image.

Figure 5:
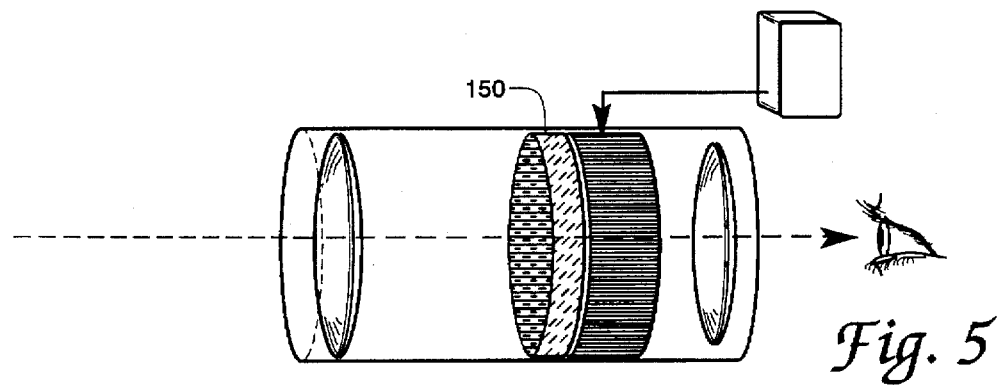
FIG. 5 shows a photoactive material arrangement of the invention.

FIG. 5 in the drawings shows an alternate arrangement of the invention, an arrangement wherein a photoactive type of material is used to achieve the desired localized irradiance attenuation achieved with the LCM devices of FIG. 2 through FIG. 4. The FIG. 5 arrangement of the invention is based on the concept of certain materials having the ability to change their optical transmissivity in direct response to the intensity or radiance level of a received optical signal. A suitable material of this type may be placed at 150 in the FIG. 5 drawing in a location between the NVD's objective lens and image intensifier tube in order to achieve the desired attenuation of a bright object image.

Certain photochromic materials are for example known to change optical (transmissive) density as a function of incurred light intensity. A common slow response and high light level example of such material is found in eye wear that darkens in sunlight and lightens indoors or at night. Another example of such materials is found in the pulse-actuated protective eye wear that has been used to protect military aviators from the flash of a nuclear weapon detonation. A fast acting, reversible, and sensitive (to very low light levels) material of this type may be used at 150 in FIG. 5 in order to achieve the present bright object attenuation purpose. The existence of a material having the needed combination of fast action, reversibility, and sensitivity to very low light level characteristics is not known at the present time; it is contemplated however, that such materials may become available in the future and thus enable the simple FIG. 5 arrangement of the present invention. In contemplating the availability of materials approaching such characteristics it should be appreciated of course that not all applications of a night vision device require the fast response speed and other characteristics needed for some more critical applications. A temporary loss of sensitivity from a bright object may be acceptable in less demanding applications so long as a reasonable ultimate recovery is assured.

Figure 6:
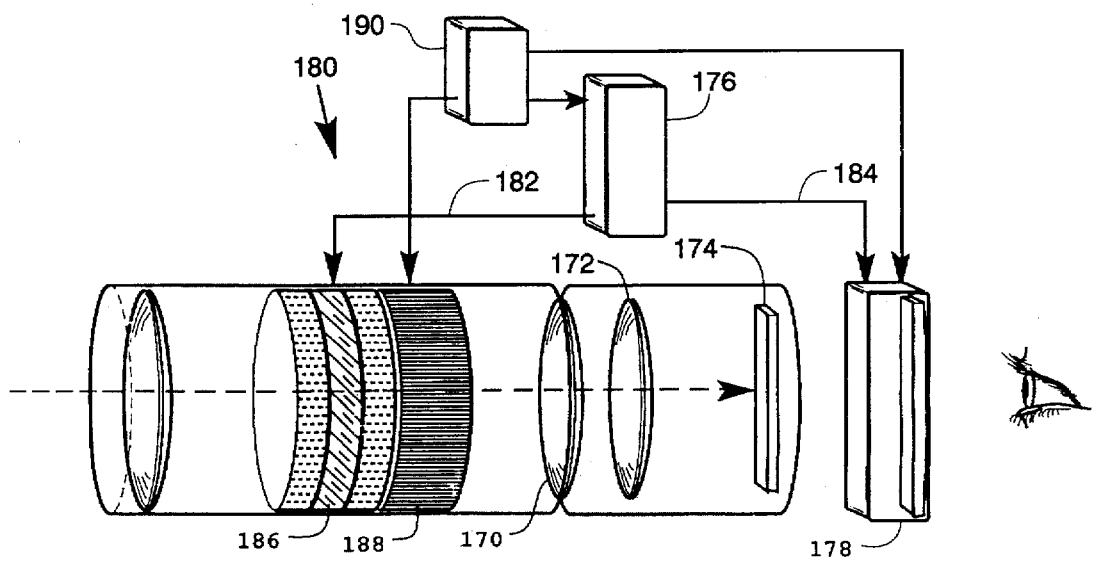
FIG. 6 shows a charge coupled device array and remote image liquid crystal arrangement of the invention.

FIG. 6 shows another alternate form of the invention. In the FIG. 6 arrangement the NVD 180 is optically coupled via relay lenses 170 and 172 to the retina 174 of a LLLCCD TV camera. Video information from the CCD array retina 174 is used to control the liquid crystal matrix 186 via the path 182 and achieve the desired blocking action of bright object images before entry to the image intensifier tube 188. The same or related video information from the CCD array retina 174 is also used via the path 184 to electronically display the intensified video image to an observer on a remotely located monochromatic TV display 178. The magnitude of the bright object image or images are electronically sensed in this arrangement of the invention. A power supply 190 provides energization for the electronic circuits 176, the image intensifier tube 188, and the monochromatic TV display 178 in the FIG. 6 arrangement of the invention.

The FIG. 6 arrangement of the invention in view of electronic sensing of the bright object image is dependent on recognizing the bright object's manifestations in video signals already processed by the image intensifier 188, the CCD array retina 174 and preliminary portions of the electronic circuits 176. Since some of these elements, particularly the image intensifier 188 may influence the nature of this video signal by way of a bloomed or saturated response to the bright object image signal, accommodation such as sensing the rate of change rather than the amplitude or sensing the area under a curve in lieu of the curve's amplitude may be desirable in the sensing portion of the electronic circuits 176. Once the liquid crystal matrix 186 has been suitably disposed to eliminate the bright object image according to the invention, video signals free of such saturation and vested with the desired contrast between objects of normal radiance level are available for reproduction on the display 178.

The present invention therefore enhances the ability of an NVD-equipped observer to see significant objects or terrain features present in darker areas of a night scene-objects or terrain features present in the company of otherwise interfering bright, localized, light sources. This improvement is achieved by way of an optical signal modification which is complementary to the normally provided automatic gain control system of a night vision device. The achieved results are believed more effective than previous all-electronic attempts to address the bright object image problem in a night vision device. The accomplished improvement to the night vision device art therefore adds capability needed during search and rescue, cargo handling, airdrop, navigation, vehicle driving, security, surveillance, battlefield management, marine piloting, special operations forces maneuvers, targeting and other military and civilian applications of night vision devices.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Bright object immune night vision apparatus comprising the combination of:

a night vision device having a viewed-scene collecting optical input port, an electrical charge signal generating retina member in optical communication with said viewed-scene collecting optical input port, an electrical charge signal transducing output image generator and an optical output port in optical communication with said electrical charge signal transducing output image generator; and selectable pattern optical attenuation apparatus disposed intermediate said input scene collecting optical input port and said electrical charge signal generating retina member, said selectable pattern optical attenuation apparatus including optical signal attenuation means, responsive to shape and intensity characteristics of a bright object input image portion received by said night vision device, for spatially selected radiance attenuation of said bright object spatial portion from said input image.

2. The apparatus of claim 1 wherein said optical signal attenuation means in said selectable pattern optical attenuation apparatus comprises a photoactive material having optical energy activated optical radiance attenuation characteristics.

3. The apparatus of claim 1 wherein said optical signal attenuation means in said selectable pattern optical attenuation apparatus comprises a liquid crystal material and wherein said apparatus further includes electrical circuit means responsive to said bright object input image for selectively altering a radiance attenuation characteristic of said liquid crystal material in a pattern corresponding with said bright object input image.

4. The apparatus of claim 3 wherein said selectable pattern optical attenuation apparatus further includes a liquid crystal material-connected second retina member responsive to said bright object input image.

5. The apparatus of claim 4 wherein said selectable pattern optical attenuation apparatus further includes a first optical polarizing element disposed on an optical input side of said liquid crystal material and a second optical polarizing element disposed on an optical output side of said liquid crystal material.

6. The apparatus of claim 1 wherein said night vision apparatus includes an automatic gain control electrical circuit and wherein said selectable pattern optical attenuation apparatus and said automatic gain control electrical circuit are characterized by compatible operating rates wherein said bright object input image is precluded from determination of an output signal level from said automatic gain control electrical circuit by said selectable pattern optical attenuation apparatus.

7. The apparatus of claim 1 wherein said selectable pattern optical attenuation apparatus optical signal attenuation means includes selectable attenuation of at least fifty percent opacity.

8. The apparatus of claim 1 wherein said electrical charge signal generating retina member in optical communication with said viewed-scene collecting optical input port, and said electrical charge signal transducing output image generator each comprise portions of a passive image intensifier tube.

9. The method for enhancing low radiance object reproduction in the presence of a concurrent high radiance signal within the input image field of an automatic gain control-inclusive night vision device, said method comprising the steps of:

examining an optical representation of said input image field for presence of optical signal portions exceeding a selected radiance level;

optically attenuating from said input image field physical portions thereof corresponding to said high radiance level signal;

generating a night vision device sensitivity-determining automatic gain control signal from lower radiance object portions of said input image field remaining after said optically attenuating step;

transducing said lower radiance object portions of said input image field remaining after said optically attenuating step to electrical charge video signals;

reproducing said remaining lower radiance object portions of said input image in an output image generator portion of said night vision device from amplified of said electrical charge video signals; and controlling an electrical charge video signal communicating portion of said night vision device and thereby a communicating of said electrical charge video signals relevant to said reproducing step with said sensitivity-determining automatic gain control signal.

10. The method for enhancing low radiance object reproduction of claim 9 wherein said step of examining an optical representation of said input image field for presence of optical signal portions exceeding a selected radiance level includes capturing said input image field on a second optical signal to electrical signal transducing device separate from a first optical signal to electrical signal transducing device used in reproducing said input image field as an output of said night vision device.

11. The method for enhancing low radiance object reproduction of claim 10 further including the step of communicating input image field optical signals to said first and second optical signal to electrical signal transducing devices via a beam splitting optical element.

12. The method for enhancing low radiance object reproduction of claim 9 wherein said step of optically attenuating from said input image field physical portions thereof corresponding to said high radiance level signal includes electrically switching a liquid crystal display optical element from an optically transparent to an optically opaque state in portions thereof transmitting said high radiance level signal.

13. The method for enhancing low radiance object reproduction of claim 12 wherein said step of optically attenuating from said input image field physical portions thereof corresponding to said high radiance level signal further includes communicating said input image field through linear optical polarizing elements before and after said liquid crystal display optical element.

14. The method for enhancing low radiance object reproduction of claim 9 wherein said step of optically attenuating from said input image field physical portions thereof corresponding to said high radiance level signal includes switching a photoactive material optical element from an optically transparent to an optically opaque state in portions thereof transmitting said high radiance level signal.

15. The method for enhancing low radiance object reproduction of claim 14 wherein said step of switching a photoactive material optical element from an optically transparent to an optically opaque state in portions thereof transmitting said high radiance level signal includes switching said photoactive material in direct chemical/physical response to said high radiance level signal.

16. Bright object repressed night vision apparatus comprising the combination of:

a night vision device having a viewed-scene collecting optical input port, an electron signal generating retina member in optical communication with said viewed-scene collecting optical input port, an amplified electron signal transducing output image generator and an optical output port in communication with said amplified electron signal transducing output image generator;

a liquid crystal matrix optical attenuation member having electrical density signal-controllable selectable pattern optical transparency and optical attenuation transmission characteristics;

said liquid crystal matrix optical attenuation member being disposed intermediate said viewed-scene collecting optical input port and said electron signal generating retina member in an optical input portion of said night vision device; and an electrical density controlling signal generating electrical circuit responsive to a bright object portion of said viewed-scene and having an output signal connected in selectable pattern determining relationship with said liquid crystal matrix optical attenuation member.

17. The apparatus of claim 16 further including a liquid crystal matrix-controlling bright object responsive second electrical signal generating retina member in optical communication with said viewed-scene and in electrical communication with said electrical density signal generating electrical circuit.

18. The apparatus of claim 16 further including:

a video electrical signal generating charge coupled device second electrical signal generating retina member in optical communication with an output image of said amplified electron signal transducing output image generator; and electronic circuit means for generating both said electrical density controlling signal and a television display-controlling video signal from said charge coupled device video electrical signal.

* * * * *